United States Patent
Mesecher et al.

(10) Patent No.: US 7,145,894 B2
(45) Date of Patent: *Dec. 5, 2006

(54) CONTINUOUSLY ADJUSTED-BANDWIDTH DISCRETE-TIME PHASE-LOCKED LOOP

(75) Inventors: David K. Mesecher, Huntington Station, NY (US); Rui Yang, Greenlawn, NY (US); Ramón Cerda, West Babylon, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/175,924

(22) Filed: Jul. 6, 2005

(65) Prior Publication Data

US 2005/0243790 A1 Nov. 3, 2005

Related U.S. Application Data

(63) Continuation of application No. 10/643,792, filed on Aug. 19, 2003, which is a continuation of application No. 09/558,686, filed on Apr. 24, 2000, now Pat. No. 6,608,826, which is a continuation of application No. 08/871,109, filed on Jun. 9, 1997, now Pat. No. 6,055,231.

(60) Provisional application No. 60/037,914, filed on Mar. 12, 1997.

(51) Int. Cl.
*H04B 7/216* (2006.01)

(52) U.S. Cl. ............... 370/342; 370/514; 375/376

(58) Field of Classification Search .............. 370/335, 370/320, 342, 441, 206, 514, 345, 430, 436, 370/463, 480, 516, 152; 375/206, 209, 143, 375/141, 200, 375, 149, 150, 376, 224, 145, 375/130, 340, 232–234, 220–222; 530/399; 455/422, 259, 260, 296; 707/11; 329/307, 329/309, 306, 308; 331/11
See application file for complete search history.

(56) References Cited

U.S. PATENT DOCUMENTS

| | | | |
|---|---|---|---|
| 3,983,501 A | 9/1976 | Lindstrum | 329/307 |
| 4,243,941 A | 1/1981 | Zdunek | 329/309 |
| 4,354,277 A | 10/1982 | Crackel et al. | 455/259 |
| 4,513,429 A | 4/1985 | Roeder | 375/376 |

(Continued)

*Primary Examiner*—John Pezzlo
(74) *Attorney, Agent, or Firm*—Volpe and Koenig, P.C.

(57) ABSTRACT

A user equipment which receives a CDMA communication signal that is wirelessly transmitted includes a system for correcting phase errors in an information signal which has been transmitted. The correction system comprises circuitry for generating a correction signal and for combining the correction signal with the information signal to produce a corrected information signal. An analyzer analyzes the phase of the corrected information signal and generates an error signal based on the deviation of the analyzed phase from a reference phase. A bandwidth controller recursively adjusts the phase of the corrected information signal such that the phase of said corrected information signal is substantially equal to said reference phase. The bandwidth controller selects a bandwidth within an adjustable range based on the error signal, estimates an offset based on the error signal, and modifies the correction signal using the offset.

11 Claims, 14 Drawing Sheets

U.S. PATENT DOCUMENTS

| | | | |
|---|---|---|---|
| 4,630,283 A | 12/1986 | Schiff | 375/143 |
| 5,029,180 A | 7/1991 | Cowart | 375/141 |
| 5,049,830 A | 9/1991 | Yoshida | 329/306 |
| 5,065,107 A | 11/1991 | Kumar et al. | 329/308 |
| 5,101,416 A | 3/1992 | Fenton et al. | 375/150 |
| 5,142,246 A | 8/1992 | Petersson | 331/11 |
| 5,166,952 A | 11/1992 | Omura et al. | 375/149 |
| 5,175,729 A | 12/1992 | Borras et al. | 370/345 |
| 5,241,700 A | 8/1993 | Geesen et al. | 455/260 |
| 5,390,207 A | 2/1995 | Fenton et al. | 375/149 |
| 5,402,448 A | 3/1995 | Marko et al. | 375/340 |
| 5,541,965 A | 7/1996 | Daffara | 375/326 |
| 5,598,468 A | 1/1997 | Ammicht et al. | 374/406.08 |
| 5,619,524 A | 4/1997 | Ling et al. | 375/130 |
| 5,694,388 A | 12/1997 | Sawahashi et al. | 370/206 |
| 5,754,583 A | 5/1998 | Eberhardt et al. | 375/147 |
| 5,761,239 A | 6/1998 | Gold et al. | 375/150 |
| 5,790,591 A | 8/1998 | Gold et al. | 375/142 |
| 5,875,215 A | 2/1999 | Dobrica | 375/344 |
| 5,900,785 A | 5/1999 | Freed | 331/10 |
| 6,055,231 A | 4/2000 | Mesecher et al. | 370/342 |
| 6,101,176 A | 8/2000 | Honkasalo et al. | 370/335 |
| 6,115,411 A | 9/2000 | Van Driest | 375/130 |
| 6,141,378 A * | 10/2000 | d'Oreye de Lantremange | 375/232 |
| 6,608,826 B1 * | 8/2003 | Mesecher et al. | 370/342 |
| 2005/0265430 A1 * | 12/2005 | Ozluturk et al. | 375/145 |

* cited by examiner

150

| | Q | | | | | | |
|---|---|---|---|---|---|---|---|
| | −10 | −9 | −8 | ···· | 8 | 9 | 10 |
| 10 | $\phi_1$ | $\phi_2$ | $\phi_3$ | ··· | $\phi_{19}$ | $\phi_{20}$ | $\phi_{21}$ |
| 9 | $\phi_{22}$ | $\phi_{23}$ | $\phi_{24}$ | ··· | $\phi_{40}$ | $\phi_{41}$ | $\phi_{42}$ |
| 8 | $\phi_{43}$ | $\phi_{44}$ | $\phi_{45}$ | ··· | $\phi_{61}$ | $\phi_{62}$ | $\phi_{63}$ |
| ⋮ | ⋮ | ⋮ | ⋮ | ⋮ | ⋮ | ⋮ | ⋮ |
| −8 | $\phi_{379}$ | $\phi_{380}$ | $\phi_{381}$ | ··· | $\phi_{397}$ | $\phi_{398}$ | $\phi_{399}$ |
| −9 | $\phi_{400}$ | $\phi_{401}$ | $\phi_{402}$ | ··· | $\phi_{418}$ | $\phi_{419}$ | $\phi_{420}$ |
| −10 | $\phi_{421}$ | $\phi_{422}$ | $\phi_{423}$ | ··· | $\phi_{439}$ | $\phi_{440}$ | $\phi_{441}$ |

(I on left axis)

FIG. 7

CONTINUOUSLY ADJUSTED-BANDWIDTH DISCRETE-TIME PHASE-LOCKED LOOP

CROSS REFERENCE TO RELATED APPLICATIONS

This application is a continuation of U.S. patent application Ser. No. 10/643,792, filed Aug. 19, 2003, which is a continuation of U.S. patent application Ser. No. 09/558,686, filed Apr. 24, 2000, now U.S. Pat. No. 6,608,826, issued Aug. 29, 2003 which is a continuation of U.S. patent application Ser. No. 08/871,109, filed Jun. 9, 1997, now U.S. Pat. No. 6,055,231, issued Apr. 25, 2000, which in turn claims priority from U.S. Provisional Patent Application Ser. No. 60/037,914, filed Mar. 12, 1997 which are incorporated by reference as if fully set forth.

FIELD OF INVENTION

This invention is generally directed to wireless digital communication systems. More particularly, the invention is directed to a code division multiple access (CDMA) receiver having a continuously adjustable bandwidth phase-locked loop for accurately determining the carrier frequency of a received signal.

BACKGROUND

Over the last decade consumers have become accustomed to the convenience of wireless communication systems. This has resulted in a tremendous increase in the demand for wireless telephones, wireless data transmission and wireless access to the World Wide Web. Since the amount of available RF spectrum is fixed, the need to utilize the RF spectrum more efficiently has become paramount.

CDMA communication systems have shown promise in the effort to provide more efficient utilization of the RF spectrum, particularly Broadband Code Division Multiple Access™ or (B-CDMA™) communication systems. B-CDMA™ communication systems permit many communications to be transmitted over the same bandwidth, thereby greatly increasing the capacity of the RF spectrum. In a B-CDMA™ communication system, an information signal at the transmitter is mixed with a pseudorandom "spreading code" which spreads the information signal across the entire communicating bandwidth. The spread signal is upconverted to an RF signal for transmission. A receiver, having the same pseudorandom spreading code, receives the transmitted RF signal and mixes the received signal with an RF sinusoidal signal generated at the receiver by a first-stage local oscillator (LO) to downconvert the spread spectrum signal. The spreaded information signal is subsequently mixed with the pseudorandom spreading code, which has also been locally generated, to obtain the original information signal.

In order to detect the information embedded in a received signal, a receiver must know the exact pseudorandom spreading code that was used to spread the signal. All signals which are not encoded with the pseudorandum code of the receiver appear as background noise to the receiver. Accordingly, as the number of users that are communicating within the operating range of a particular base station increases, the amount of background noise also increases, making it difficult for receivers to properly detect and receive signals. The transmitter may increase the power of the transmitted signal, but this will increase the noise as seen by other receivers. Therefore, increasing the signal-to-noise ratio of a received signal without requiring a corresponding increase in the transmission power of the signal is desirable.

One way to increase the signal-to-noise ratio of a received signal is to ensure that the first stage local oscillator (LO) at the receiver is at the same frequency as the received RF carrier signal. If there is a slight frequency offset, the offset will manifest itself in the baseband section of the receiver as a phase error on the decoded QPSK symbol, resulting in a degradation of the quality of the communication.

Accordingly, it is critical to properly detect the frequency of the received RF carrier signal in order to optimize the quality of the received signal.

SUMMARY

The continuously adjusted-bandwidth phase-locked loop (PLL) of the present invention is used by a B-CDMA™ receiver to correct for any deviation, or offset, that may exist between the received radio frequency (RF) carrier signal and the frequency of the first stage LO that converts the received RF carrier signal to an intermediate frequency (IF). The PLL in the receiver includes a filter with an adjustable bandwidth. A wider bandwidth is used during initial acquisition of the received signal. After the PLL has acquired the received carrier signal using the wider bandwidth, the bandwidth of the filter is gradually narrowed to provide a low steady-state error. Accordingly, it is an object of the invention to provide an improved CDMA receiver which corrects for any offset that may exist between the received RF carrier signal and the frequency of the first stage LO.

Other objects and advantages will become apparent to those skilled in the art after reading the detailed description of a presently preferred embodiment.

BRIEF DESCRIPTION OF THE DRAWING(S)

FIG. 7 is a look-up table utilized to implement the arctangent analyzer;

DETAILED DESCRIPTION OF THE PREFERRED EMBODIMENTS

Figure 1:
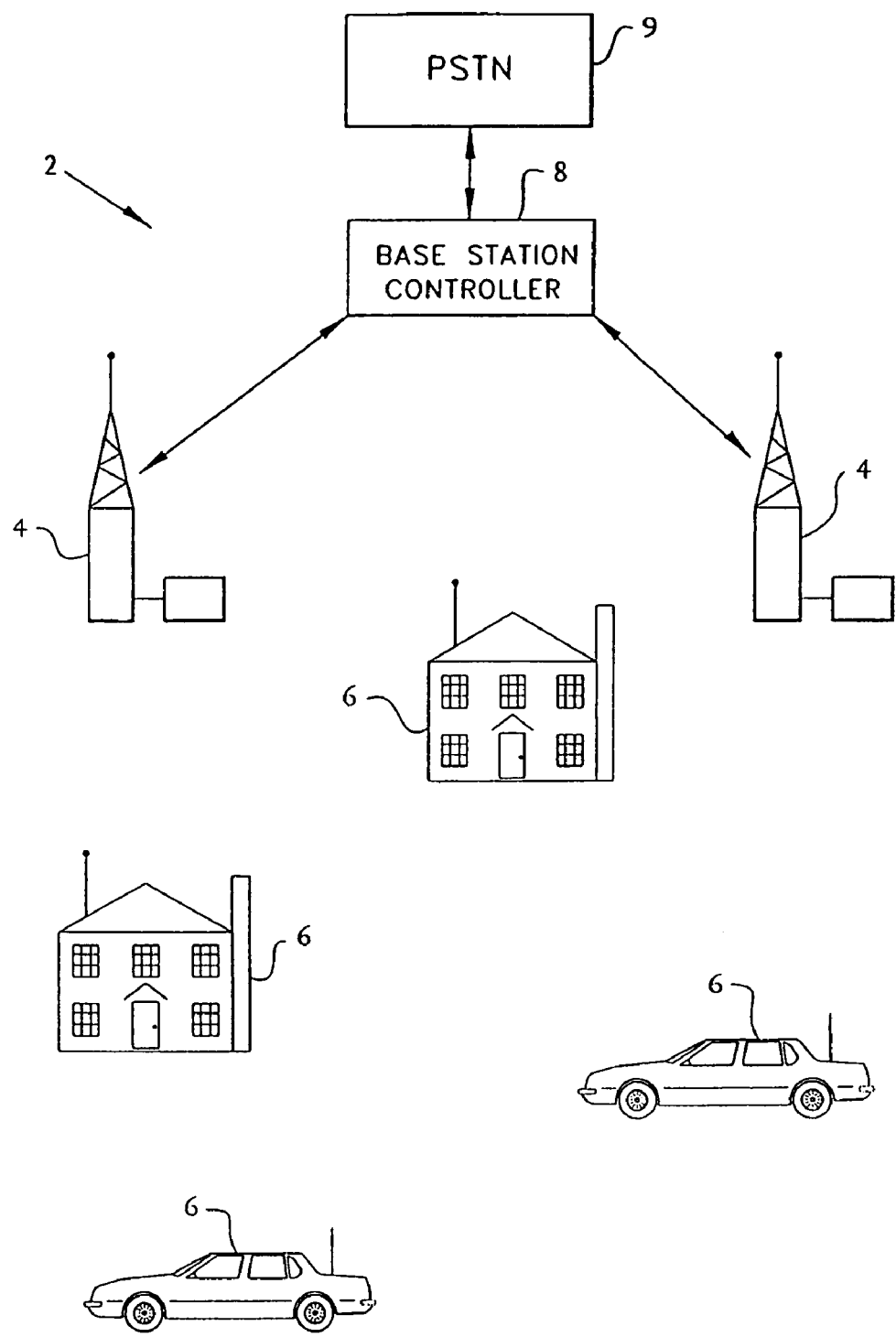
FIG. 1 is a communication network embodying the present invention.

The preferred embodiment will be described with reference to the drawing figures wherein like numerals represent like elements throughout.

A communication network 2 embodying the present invention is shown in FIG. 1. The communication network 2 generally comprises one or more base stations 4, each of which is in wireless communication with a plurality of subscriber units 6, which may be fixed or mobile. Each subscriber unit 6 communicates with either the closest base station 4 or the base station 4 which provides the strongest communication signal. The base stations 4 also communicate with a base station controller 8, which coordinates communications among base stations 4. The communication network 2 may also be connected to a public switched telephone network (PSTN) 9, wherein the base station controller 8 also coordinates communications between the base stations 4 and the PSTN 9. Preferably, each base station 4 communicates with the base station controller 8 over a wireless link, although a land line may also be provided. A land line is particularly applicable when a base station 4 is in close proximity to the base station controller 8.

The base station controller 8 performs several functions. Primarily, the base station controller 8 provides all of the operations, administrative and maintenance (OA&M) signaling associated with establishing and maintaining all of the wireless communications between the subscriber units 6, the base stations 4, and the base station controller 8. The base station controller 8 also provides an interface between the wireless communication system 2 and the PSTN 9. This interface includes multiplexing and demultiplexing of the communication signals that enter and leave the system 2 via the base station controller 8. Although the wireless communication system 2 is shown employing antennas to transmit RF signals, one skilled in the art should recognize that communications may be accomplished via microwave or satellite uplinks. Additionally, the functions of the base station controller 8 may be combined with a base station 4 to form a "master base station".

Figure 2:
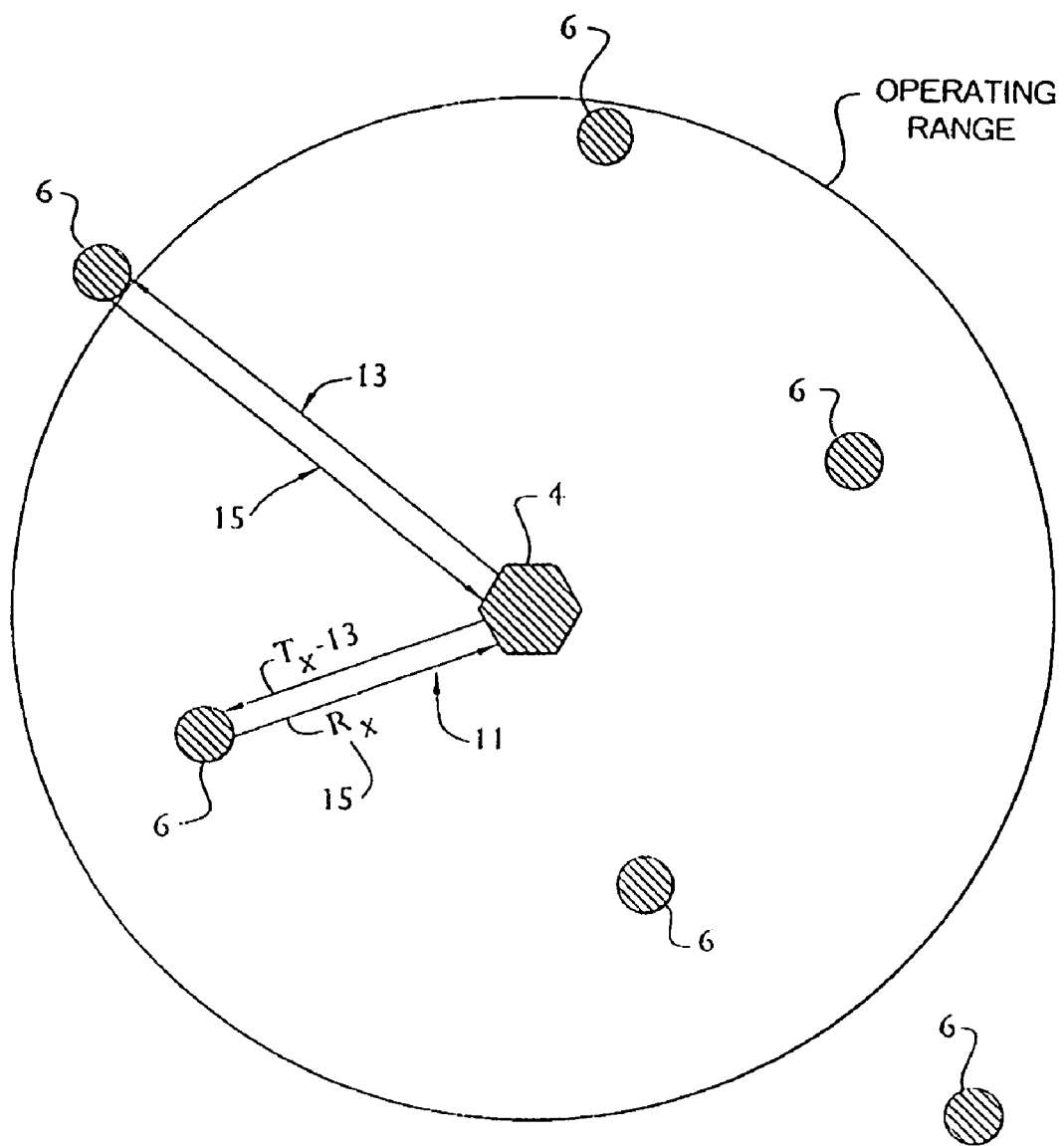
FIG. 2 shows propagation of signals between a base station and a plurality of subscriber units.

Referring to FIG. 2, the propagation of signals between a base station 4 and a plurality of subscriber units 6 is shown. A two-way communication channel 11 comprises a signal transmitted 13 (Tx) from the base station 4 to the subscriber unit 6 and a signal received 15 (Rx) by the base station 4 from the subscriber unit 6. The signaling between the base station 4 and the subscriber units 6 includes the transmission of a pilot signal 17. The pilot signal 17 is a spreading code which carries no data bits. The pilot signal 17 is used for subscriber unit 6 acquisition and synchronization, as well as for determining the parameters of the adaptive matched filter used in the data receiver.

The subscriber unit 6 must acquire the pilot signal 17 transmitted by the base station 4 before it can receive or transmit any data. Acquisition is the process whereby the subscriber unit 6 aligns its locally generated spreading code with the received pilot signal 17. The subscriber unit 6 searches through all of the possible phases of the received pilot signal 17 until it detects the correct phase, (the beginning of the pilot signal 17).

The PLL 10 in accordance with the present invention acts upon the transmitted pilot signal 17, which is an auxiliary signal transmitted from the base station 4 to all subscriber units 6 and from subscriber units 6 to the base station 4 which is not used as a traffic channel to transmit any voice or data information. With respect to the subscriber units 6, the signal 17 is used: 1) to provide synchronization of the locally generated pseudorandom code with the transmitted pseudorandom code; and 2) as a transmission power reference during initial power ramp-up of the subscriber unit 6. With respect to the base station 4, the pilot signal 17 is utilized to provide synchronization of the locally generated pseudorandom code with the transmitted pseudorandom code. In accordance with the present invention, the pilot signal 17 is additionally used in both the base station 4 and the subscriber unit 6 to determine the difference between the frequency of the received RF carrier signal and the first stage LO that downconverts the received RF carrier signal to IF.

The CDMA pilot signal 17 is a sequence of pseudorandom complex numbers which are modulated by a constant complex pilot value having a magnitude of one and phase of zero. The advantage of using the pilot signal 17 is that the transmitted despread value is known to the subscriber unit 6. This can be used by the PLL 10 in the subscriber unit 6 to estimate and correct for phase error due to RF carrier signal offset.

The difference in the frequency of the received RF carrier signal and the first stage LO can be generally attributed to two sources: 1)component mismatches; and 2)RF distortion. Component mismatches between the transmitter oscillator 4 and the receiver oscillator 6 may cause slightly different oscillator outputs. These component mismatches can be further exacerbated by local environmental conditions, such as the heating or cooling of electronic components, which may cause performance changes in the components. With respect to RF distortion, doppler effects caused by the motion of the subscriber unit 6, the base station 4 or a multipath reflector may cause the RF carrier to become distorted during transmission. This may result in a RF carrier offset.

Figure 3:
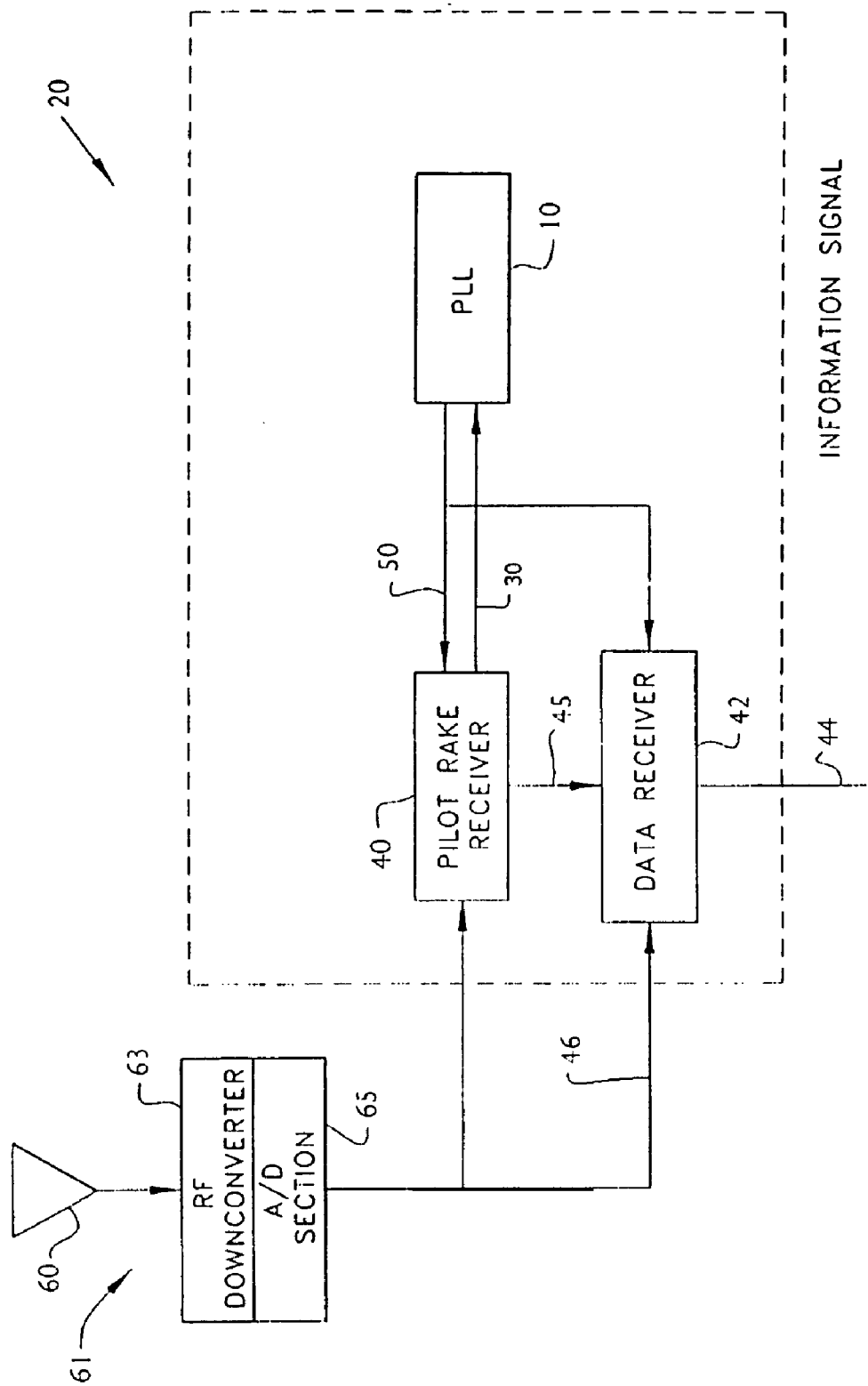
FIG. 3 is a block diagram of the PLL implemented in a programmable digital signal processor within the receiver section.

Referring to FIG. 3, the PLL 10 is implemented in a programmable digital signal processor within the digital receiver section 20 to provide flexibility in system architecture. The pilot signal 17 is received via the antenna 60 and is processed by the analog receiver section 61, which includes an RF downconverter 63 and an analog-to-digital section 65. The downconverted and digitized pilot signal 17 is then processed by the digital receiver section 20 which includes a pilot rake receiver 40, the PLL 10, and a data receiver 42. The pilot signal 17 enters the rake receiver 40 for despreading. The PLL monitors the output from the pilot rake receiver 40, which comprises the despread pilot signal 30, to estimate and correct for a phase error due to RF carrier offset, thereby providing acceptable speech quality. The pilot rake receiver 40 operates on the pilot signal 17 to build a receiver filter. The receiver filter compensates for channel distortion due to multipath effects. The filter parameters 45 are forwarded from the pilot rake receiver 40 to the data receiver 42 which constructs the receiver filter in accordance with those parameters 45. Accordingly, when a data signal enters the data receiver 42, the data receiver 42 is able to compensate for channel distortion due to multipath effects and output a more accurate information signal 44.

Figure 4:
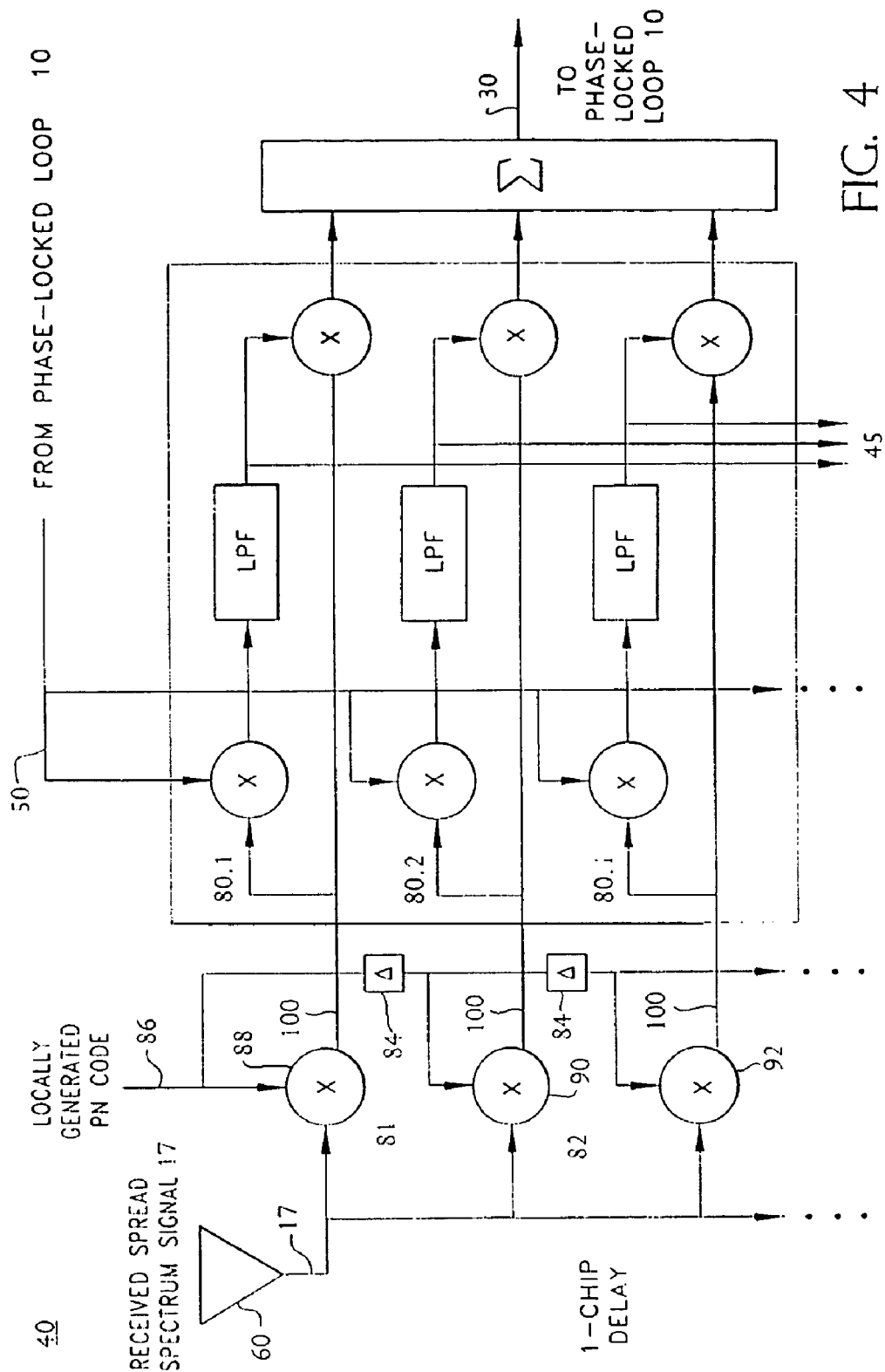
FIG. 4 is a detailed block diagram of a rake receiver used in accordance with the teachings of the present invention.

The rake receiver 40 is shown in greater detail in FIG. 4. The rake receiver 40 provides an estimate of the complex impulse response, having real and imaginary components, of the channel over which the pilot signal 17 is transmitted. The rake receiver 40 has a plurality of independent rake elements 80.1, 80.2, 80.i, wherein the input to each rake element 80.1, 80.2, 80.i is a delayed and despread replica 100 of the received pilot signal 17. The amount of delay 84 between adjacent rake elements 80.1, 80.2, 80.i is one chip. The delayed replicas 100 of the pilot signal 17 are created without delay lines by using a mixer 88, 90, 92 to correlate the received pilot signal 17 with the locally generated pilot pseudonoise code 86, offset by the appropriate amount of chips 84.

Each rake element 80.1, 80.2, 80.i performs an open loop estimation of the value of the impulse response of the RF channel, which can be represented as h(t), at the point t=T*i, where T is the length of a chip. Thus, the rake receiver 40 produces N noisy estimates of the sampled impulse response of the channel of the received pilot signal 17, at evenly spaced intervals, where N is the number of rake elements 80.1, 80.2, 80.i. The low pass filter on each rake element 80.1, 80.2, 80.i smoothes each corresponding sample impulse response estimate. The complex conjugates of each smoothed sampled impulse response estimate are used as the weights on the channel-matching filter. This serves to remove the signal distortion from the received pilot signal 17 and data signals 46 that occur due to multipath effects in the channel.

The pilot rake receiver 40 and the PLL 10 operate in conjunction with one another in the receiver section 20. In order for the PLL 10 to perform optimally, it requires a despread pilot signal 30 with the distortion effects due to multipath removed. This is accomplished by the adaptive matched filter obtained from using the channel-impulse-response estimate provided by the pilot rake receiver 40. The pilot rake receiver 40 and the data receiver 42 cannot operate effectively unless the received pilot signal 17 and the data signals 46 have been corrected for phase error due to RF carrier signal offset. The phase error correction signal 50 is provided by the PLL 10 to the pilot rake receiver 40 and data receiver 42. Optimal performance of the receiver 20 will not occur until the pilot rake receiver 40 and the PLL 10 have reached a mutually satisfactory equilibrium point. The operation of the data receiver 42 is well known to those of skill in the art.

Figure 5:
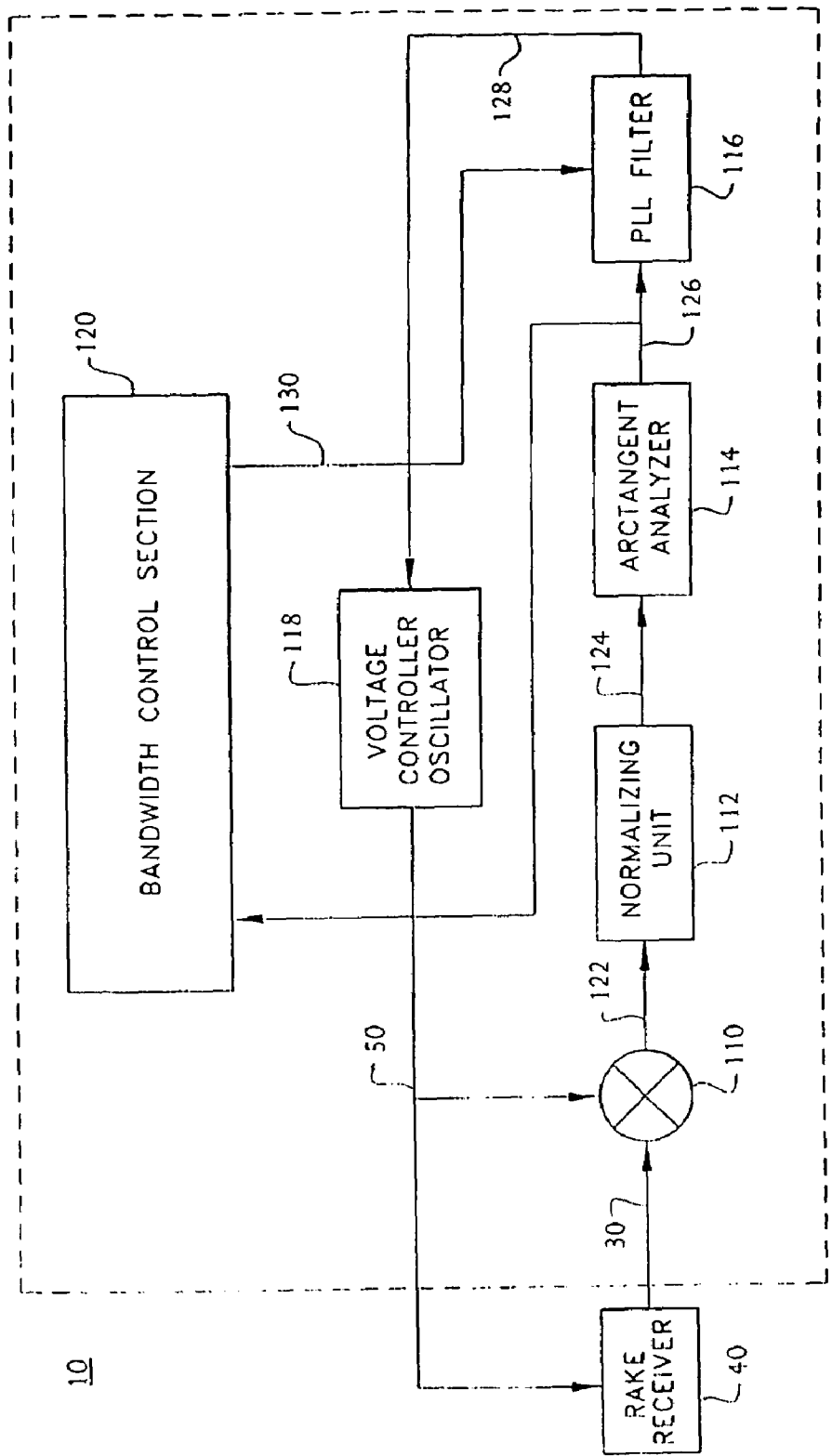
FIG. 5 is a block diagram of the continuously adjustable bandwidth PLL in accordance with the present invention.

Referring to FIG. 5, the continuously adjusted-bandwidth PLL 10 in accordance with the present invention is shown. The PLL 10 comprises a mixer 110, a normalizing unit 112, an arctangent analyzer 114, a PLL filter 116, a voltage controlled oscillator (VCO) 118, and a bandwidth control section 120. The mixer 110 receives its input from the pilot rake receiver 40. The signal output from the rake receiver 40 is the despread pilot signal 30 which has been processed to correct channel distortion due to multipath effects. This signal 30 is mixed with a "correction signal" 50 to produce a complex error signal 122. In accordance with the present invention, the bandwidth of the PLL filter 116 is adjusted by the bandwidth control section 120 to provide a revised correction signal 50 to the mixer 110, the rake receiver 40, and the data receiver 42. This process is repeated until the complex error signal 122 output from the mixer 110 is at a minimum. It is desired to have the complex error signal 122 as small as possible; ideally it should be zero.

Figure 6:
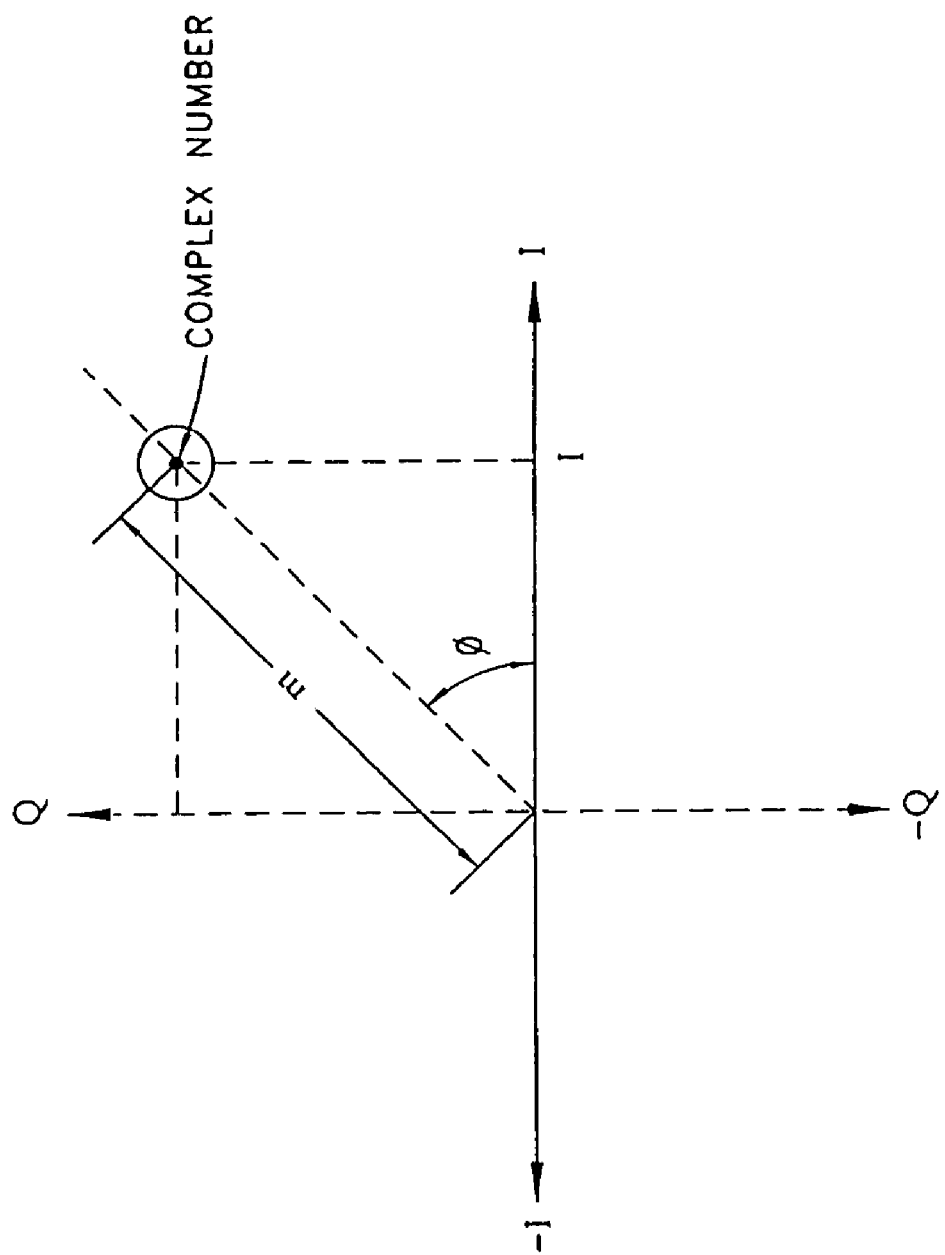
FIG. 6 is a diagram of the mapping of polar and Cartesian coordinates.

The despread pilot signal 17 is a known complex number that has zero phase. This complex number can be represented in two forms as shown in FIG. 6: 1) Cartesian form; and 2) polar form. In Cartesian form, the real part is referred to as the in-phase component, (I-component), and the imaginary part is referred to as the quadrature component, (Q-component). The polar form includes a magnitude (m) and a phase angle ($\phi$). To convert from Cartesian to polar form, the following equations are used:

$$\phi = \tan^{-1}(Q/I) \qquad \text{Equation (1)}$$

$$m = \sqrt{I^2 + Q^2} \qquad \text{Equation (2)}$$

Referring back to FIG. 5, the complex error signal 122 is processed by the normalizing unit 112, which will be described in greater detail hereinafter. The normalized signal 124 is then input into the arctangent analyzer 114. The arctangent analyzer 114 analyzes the normalized signal 124, which is in Cartesian coordinate form, using an 8I-by-8Q arctangent processor to determine the phase $\phi$ of the complex number. The arctangent analyzer 114 uses the Cartesian I and Q components which are mapped to provide the phase $\phi$ of the complex number. Although this function may be implemented in real time using a microprocessor with associated memory, it would require a high-speed processor and a large amount of memory to accurately calculate.

Figure 8:
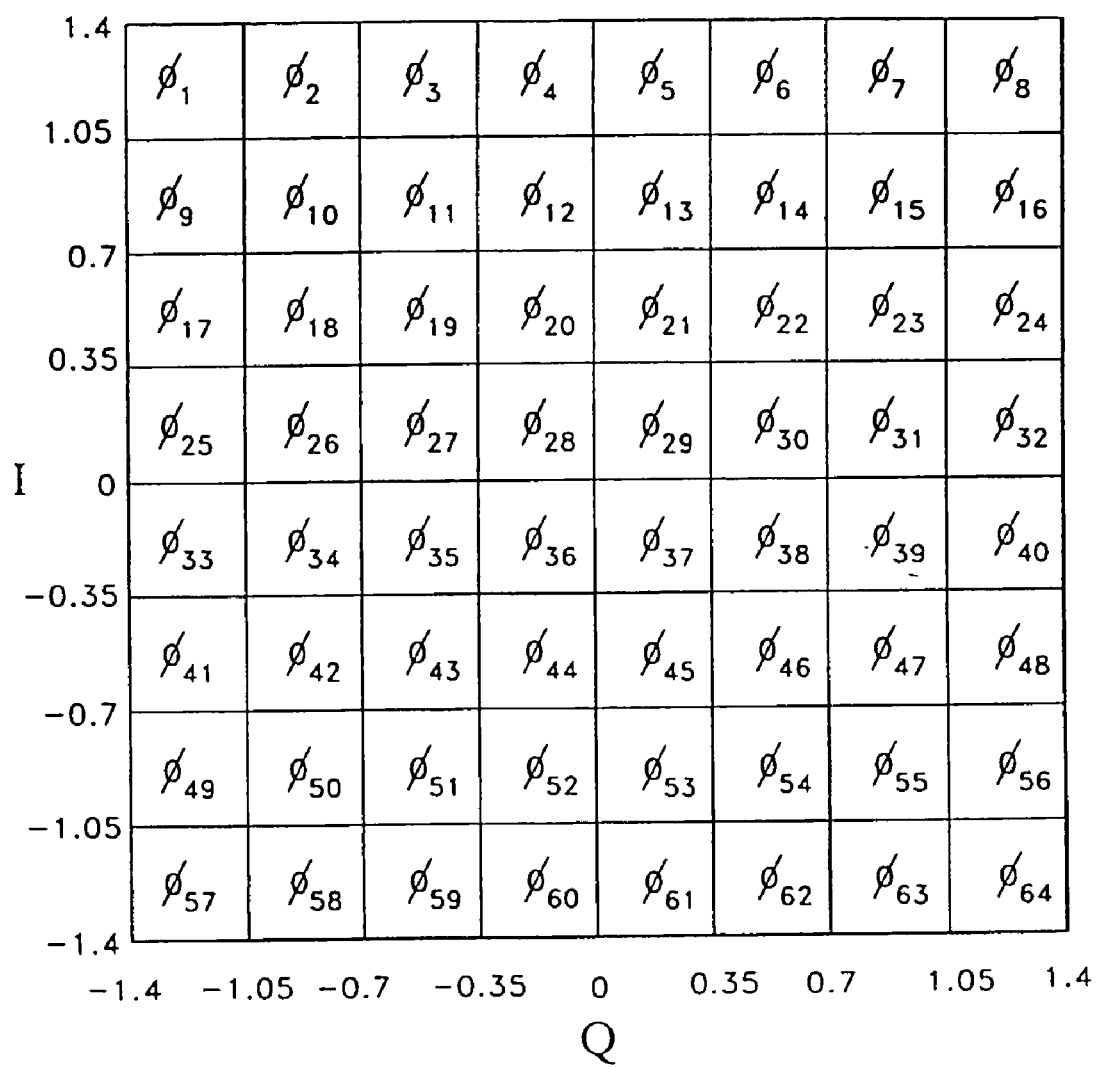
FIG. 8 is the preferred embodiment of a look-up table utilized to implement the arctangent analyzer.

Equations 1 and 2 are implemented using a lookup table 150 when finite resolution is acceptable. For example, if the I component is expected to be an integer between −10 and 10, and the Q component is expected to be an integer between −10 and 10, then the lookup table 150 shown in FIG. 7 may be implemented. The phase $\phi$ for any I and Q component pair may be obtained from the lookup table 150. For example, if I=8.8 and Q=10.1, the values would first be quantized into the integers I=9 and Q=10, resulting in a phase value $\phi_{20}$ from the lookup table 150. The arctangent analyzer 114 is preferably implemented with a lookup table 152 having eight I bins and eight Q bins, covering a range of possible I and Q values between −1.4 and +1.4, as shown in FIG. 8. For example, if I=−0.8 and Q=0.9, the lookup table 152 will return a phase value of $\phi_{55}$.

The size and complexity of lookup table 152 implemented within the arctangent analyzer 114 grows as the range of the values input into the arctangent analyzer 114 increases. Thus, if a wide range of values is permitted to be input into the arctangent analyzer 114, the arctangent function increases in complexity and the lookup table 152 dramatically increases in size. Accordingly, in order to keep the implementation as simple as possible, the complex error signal 122 is normalized by the normalizing unit 112 prior to being input into the arctangent analyzer 114. The normalizing unit 112 receives the complex error signal 122 from the mixer 110 and performs a "pseudonormalization" by dividing by the complex error signal 122 by the component, (I or Q), having the larger magnitude. Thus, the magnitude of the number output to the arctangent analyzer 114 will be between 1.0 and 1.414.

Alternatively, true normalization is performed, in which the normalizing unit 112 determines the magnitude of the complex error signal 122, then divides the error signal 122 by the magnitude. The signal 124 output from the normalizing unit 112 would be complex number with a magnitude of 1 and a phase angle which must be determined by the arctangent analyzer 114. Although pseudonormalizing the complex error signal 122 is not as optimal as normalization, pseudonormalization requires much less processing power and may be preferred in certain implementations where processing power is at a premium.

Since pseudonormalizing results in a complex number between 1.0 and 1.414, performing a pseudonormalization on the complex error signal 122 causes the resulting signal 124 to fall within a smaller input range of the domain of the lookup table 152. Moreover, by quantizing the I and Q components into 8 bins each, the size of the lookup table 152 is limited to 64 bins, with resolution that is sufficient for the desired PLL performance.

The output from the arctangent analyzer 114 is a quantized phase angle of the complex error signal 122. Since the pilot signal 17 is transmitted with zero phase angle, it is desired to adjust the quantized phase error signal 126 to have an angle of zero degrees, (a phase of zero). The bandwidth control section 120 continually monitors the quantized phase error signal 126 and generates a control signal 130 to control the bandwidth of the PLL filter 116 based on the quantized phase error signal 126. As will be explained in detail hereinafter, as the quantized phase error signal 126 approaches zero, the bandwidth of the PLL filter 116 decreases.

Referring back to FIG. 5, the quantized phase error signal 126 is provided to two sections of the PLL 10: 1) the PLL filter 116; and 2) the bandwidth control section 120. With respect to the PLL filter 116, the bandwidth of the PLL filter 116 is continuously adjustable. The PLL filter 116 has a wider bandwidth when the quantized phase error signal 126 is large, and a narrow bandwidth when the quantized phase error signal 126 is small. The bandwidth of the PLL filter 116 is selectively and continuously controlled by the bandwidth control section 120 to provide a small steady-state PLL error.

As the bandwidth of the PLL filter 116 is narrowed, the high frequency components of the quantized phase error signal 126 are filtered out. Thus, by eliminating high frequency components, rapid variations in the quantized phase error signal 126 are eliminated and the output signal is smoothed. However, since a filter with a small bandwidth does not have the ability to track rapid variations in an input signal, filters with wide bandwidths are generally used for initial tracking and locking onto a signal.

Figure 9:
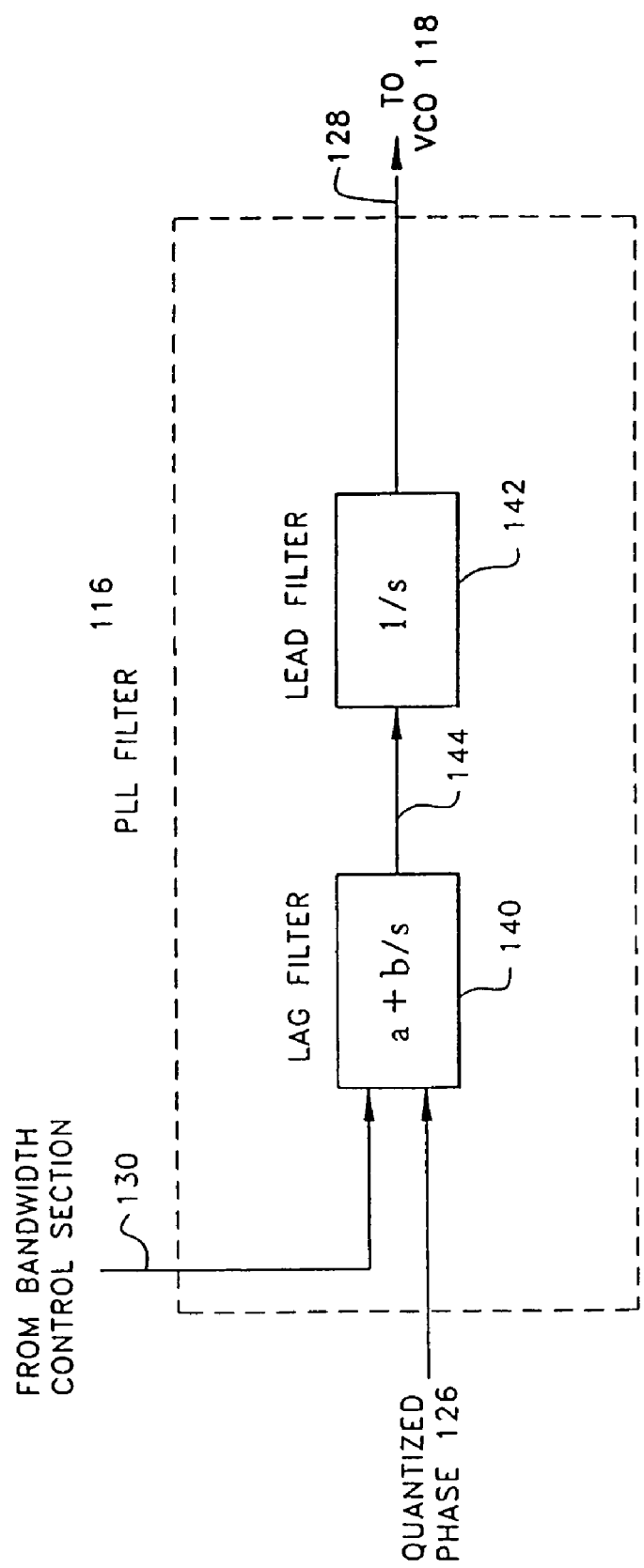
FIG. 9 is a block diagram of the PLL filter comprising a lag filter and a lead filter in accordance with the present invention.

Referring to FIG. 9, the PLL filter 116 comprises a lag filter 140 and a lead filter 142. The lag filter 140 receives two inputs: 1) the bandwidth control signal 130 from the bandwidth control section 120; and 2) the quantized phase error signal 126 output from the arctangent analyzer 114. The lag filter 140 has a Laplace transformation of $$H(s) = a + b/s \qquad \text{Equation (3)}$$

where s is the complex number that is used as the kernel for the Laplace transform:

$$H(s) = \int_0^\infty h(t) e^{-st} dt, \qquad \text{Equation (4)}$$

and the coefficients a and b are both functions of the bandwidth (BW) as follows:

$$a = 2\sqrt{2}\pi \cdot BW, \qquad \text{Equation (5)}$$

$$b = (2\pi \cdot BW)^2. \qquad \text{Equation (6)}$$

The lag filter 140 interrogates the quantized phase error signal 126 and generates an estimate of the RF carrier offset 144. The RF carrier offset 144 is input into the lead filter 142 which integrates the RF carrier offset 144 to determine an error voltage 128 corresponding to the phase error.

The output of the PLL filter 116, which is input into the VCO 118, is the error voltage 128. In response to the error voltage 128, the VCO 118 outputs a corresponding correction signal 50 to the mixer 110, the pilot rake receiver 40 and the data receiver 42.

Figure 10:
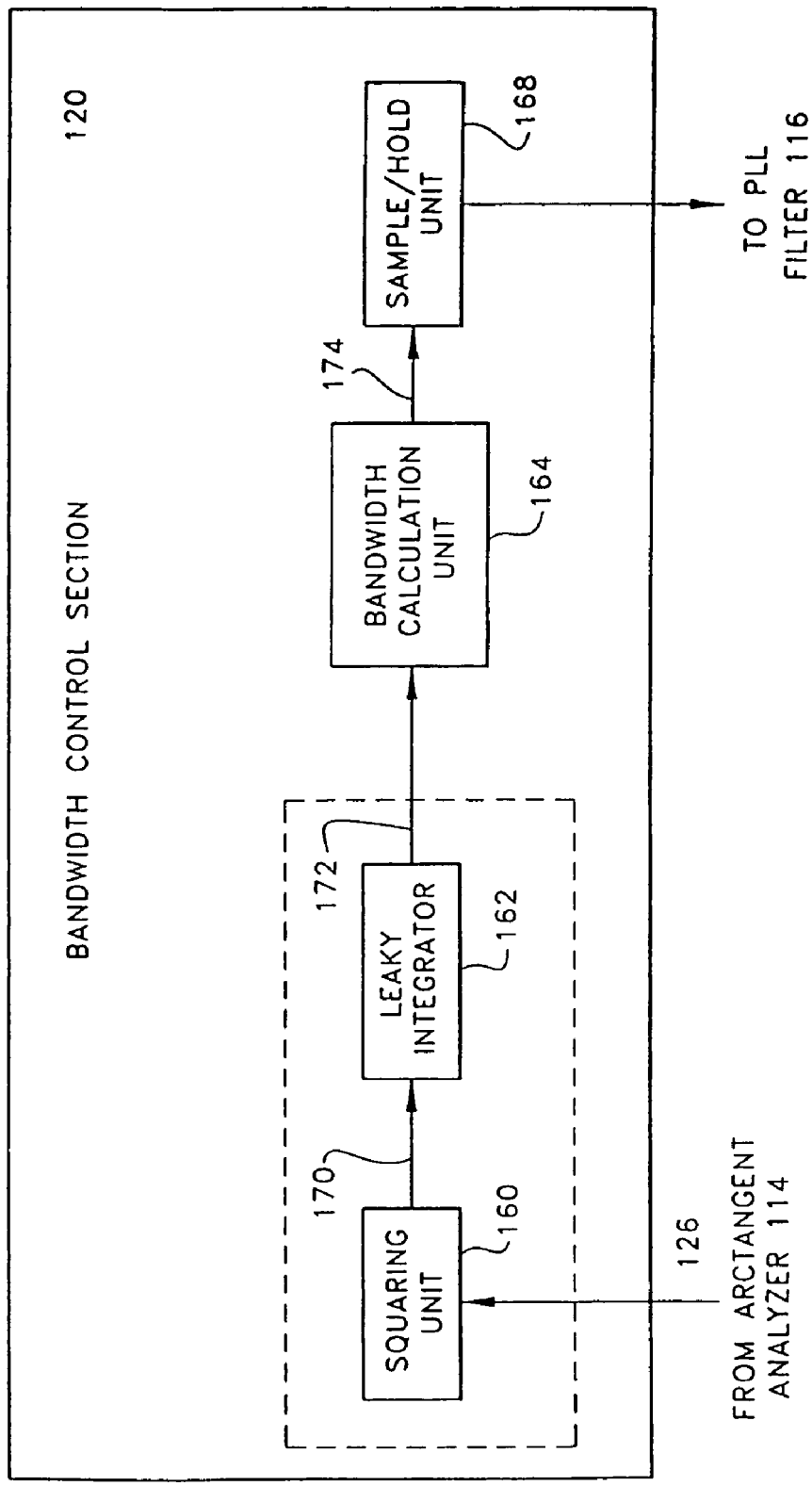
FIG. 10 is a block diagram of the bandwidth control section.

The bandwidth control section 120 will be explained in further detail with reference to FIG. 10. The bandwidth control section 120 estimates the variance of the quantized phase error signal 126 and converts this into a dynamic bandwidth.

The bandwidth control section 120 comprises four processing units: a squaring unit 160, a (leaky) integrator unit 162, a bandwidth calculation unit 164 and a sample/hold unit 168. The squaring unit 160 squares the quantized phase error signal 126. The integrator 162, which is a first order low-pass filter, then integrates and smoothes the squared signal 170. The squaring unit 160 and the integrator 162 act together to estimate the standard deviation (squared), or variance, 172 of the quantized phase error signal 126. This value 172 is then input into the bandwidth calculation unit 164.

Figure 11:
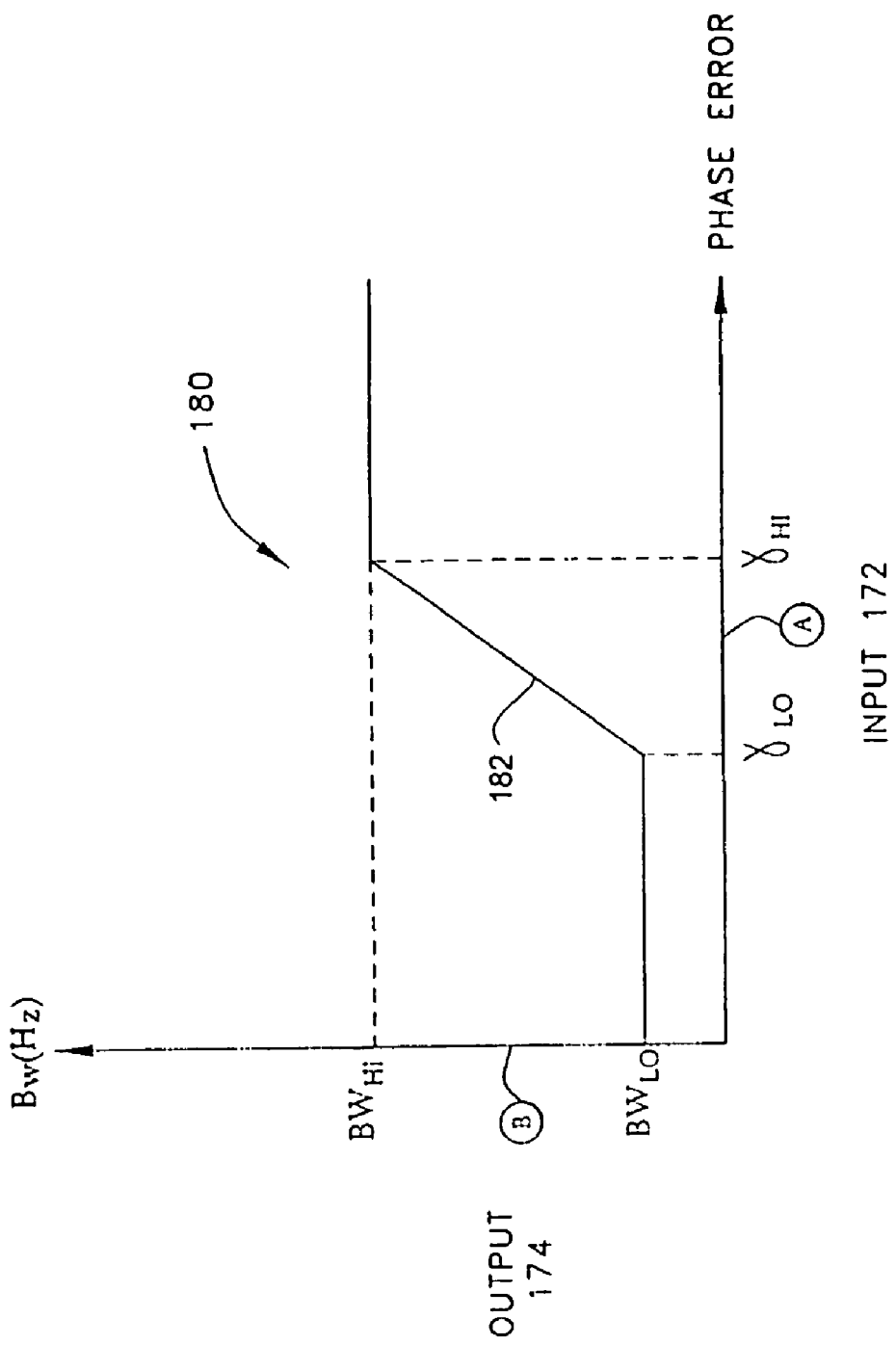
FIG. 11 illustrates the transfer function utilized in the bandwidth calculation unit.

The bandwidth calculation unit 164 determines the desired bandwidth of the PLL filter 116 based upon the input value 172. The operation of the bandwidth calculation unit 164 will be explained in detail with reference to FIG. 11. As shown, the bandwidth calculation unit 164 utilizes a select transfer function 180 to correlate the input signal 172 to a desired output bandwidth 174. The transfer function is defined by four parameters: 1) $BW_{HI}$—the widest bandwidth value; 2) $BW_{LO}$—the narrowest bandwidth; 3) $Y_{HI}$—the highest value of the variance of the quantized phase error; and 4) $Y_{LO}$—the lowest value of the variance of the quantized phase error. $BW_{HI}$ is selected to produce the shortest initial lock-on time; typically 1000 Hz. The wider the bandwidth, the faster the initial lock-on period. However, if the bandwidth is too high, lock-on will never occur since the filter will attempt to track the noise. $BW_{LO}$ is selected to provide the required PLL steady state error. Typically, 100 Hz provides 5 degree steady state error, which is acceptable for the present invention. $Y_{HI}$ and $Y_{LO}$ depend upon the input signal-to-noise ratio and the particular architecture and application. An initial estimate for $Y_{LO}$ typically is obtained by operating the PLL 10 in an "ideal" mode (the PLL produces a perfect correction for each sample). An initial estimate for $Y_{HI}$ is typically obtained by operating the PLL in the "worst case" mode (the PLL produces a random correction for each sample).

Preferably, the transfer function 180 comprises a linear portion 182 which correlates the input value 172 with the desired output bandwidth 174. It is preferable to limit the linear portion 182 of the transfer function 180 to a range of phase error input values 172 and bandwidth output values 174 in order to simplify the operation of the transfer function unit 164. For example, when the phase error input value 172 is A, the transfer function 180 will provide a desired bandwidth output 174 of B. The bandwidth calculation unit 164 may be implemented by a microprocessor which would dynamically calculate the bandwidth. Additionally, the microprocessor may be dynamically updated with different transfer functions depending upon the conditions of the system and the RF channel.

The bandwidth calculation unit 164 outputs the new bandwidth of the PLL filter 116. This bandwidth 174 is input into the sample/hold unit 168, which samples the bandwidth 174 and outputs a sampled bandwidth 130 to the PLL filter 116 every N symbols, where N is a predetermined number. A small value of N will provide better performance at the expense of increased processing. In the preferred embodiment, N=8. The sampled bandwidth 130 from the sample/hold unit 168 is input to the PLL filter 116.

Figure 12A:
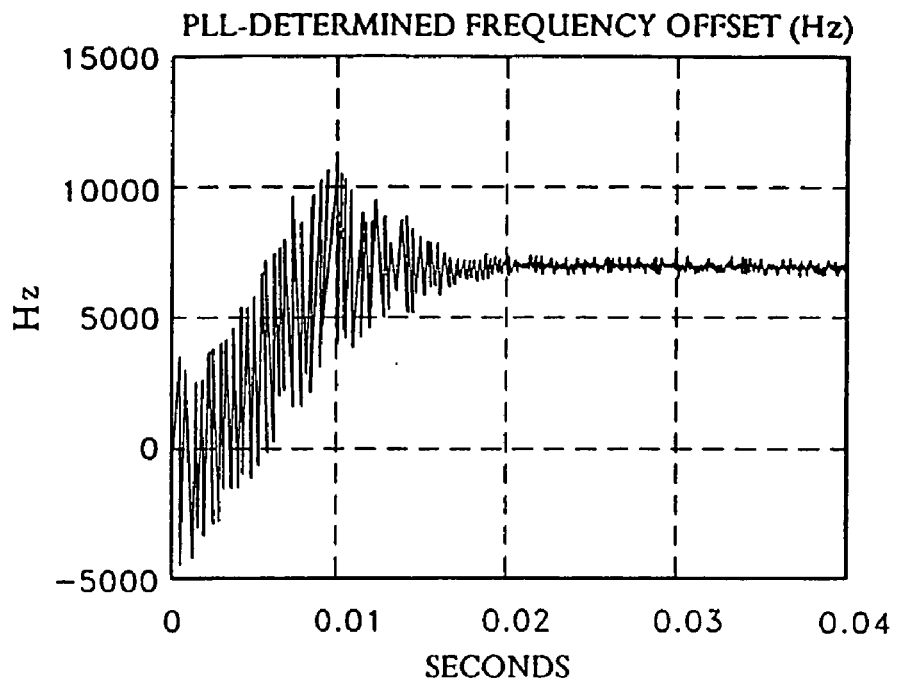
FIG. 12A is a signal diagram of the carrier offset frequency estimate provided by the output of the lag filter.

As shown in the simulation results in FIGS. 12A–D, the use of a continuously adjustable PLL 10 greatly improves the performance of the receiver 20. All four plots present data from the same simulation run. FIG. 12A shows the carrier offset frequency estimate (in Hertz) provided by the output of the lag filter 144 as a function of time in seconds. At approximately 0.01 seconds, the average of the frequency estimate quickly reaches the true value of 7000 Hz, but since the bandwidth is wide, the estimate is still noisy. As the bandwidth begins to narrow, the frequency estimate becomes less noisy. At 0.02 seconds, the bandwidth has narrowed significantly, and there is very little noise in the frequency estimate.

Figure 12B:
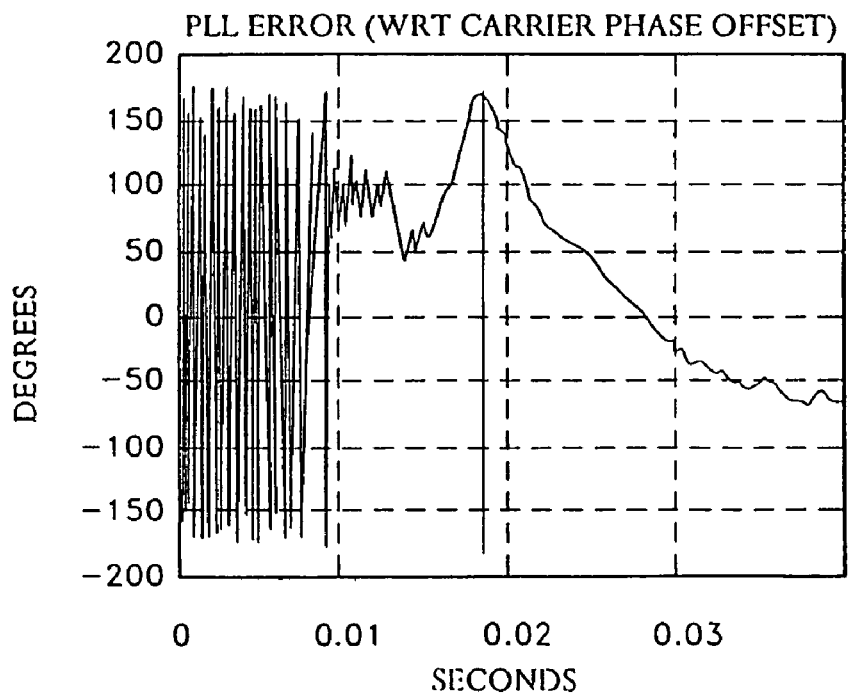
FIG. 12B is a signal diagram of the phase correction in degrees provided by the output of the lead filter.

FIG. 12B shows the phase correction (in degrees) provided by the output of the lead filter 142 as a function of time (in seconds). This correction varies widely until initial lock-on of the PLL 10 at 0.01 seconds. Since the bandwidth is still wide at this point, the correction varies. As the bandwidth is narrowed, the variation in the correction is reduced. At 0.02 seconds, the bandwidth has narrowed significantly and the variation is minimized.

Figure 12C:
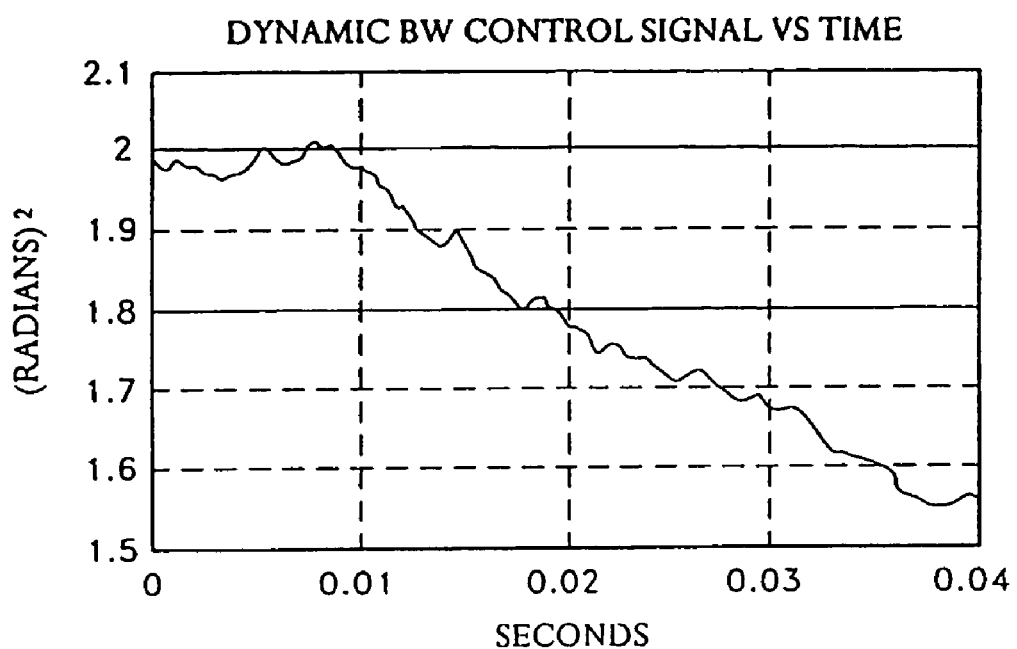
FIG. 12C is a signal diagram of the bandwidth control signal versus time.

FIG. 12C shows the bandwidth control signal (in Radians$^2$) as a function of time (in seconds), which is a measure of the variance of the phase error. After initial lock-on of the PLL 10, the variance begins to decrease which, in turn, causes the dynamic bandwidth to narrow (see FIG. 12D). The variance continues to decrease as the PLL 10 improves its ability to estimate phase correction.

Figure 12D:
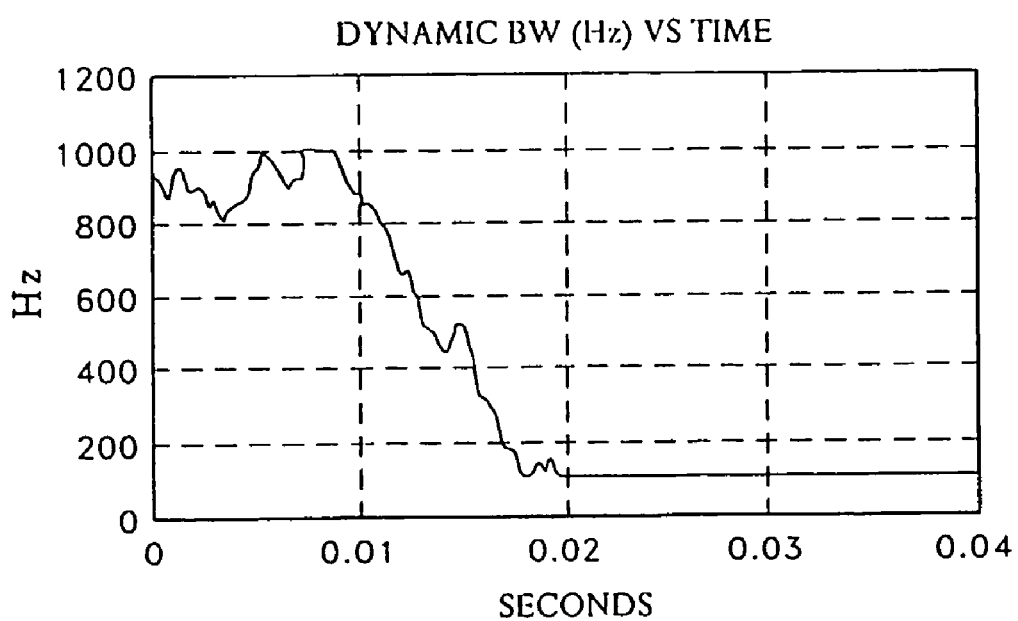
FIG. 12D is a signal diagram of the dynamic bandwidth versus time.

FIG. 12D shows the dynamic bandwidth (in Hertz) as a function of time (in seconds). The bandwidth is near its maximum of 1000 Hz up until initial lock-on of the PLL 10 at around 0.01 seconds. With lock-on, phase error is reduced, causing the bandwidth to begin narrowing. The bandwidth approaches it minimum of 100 Hz as the phase error continues to be reduced.

Figure 13:
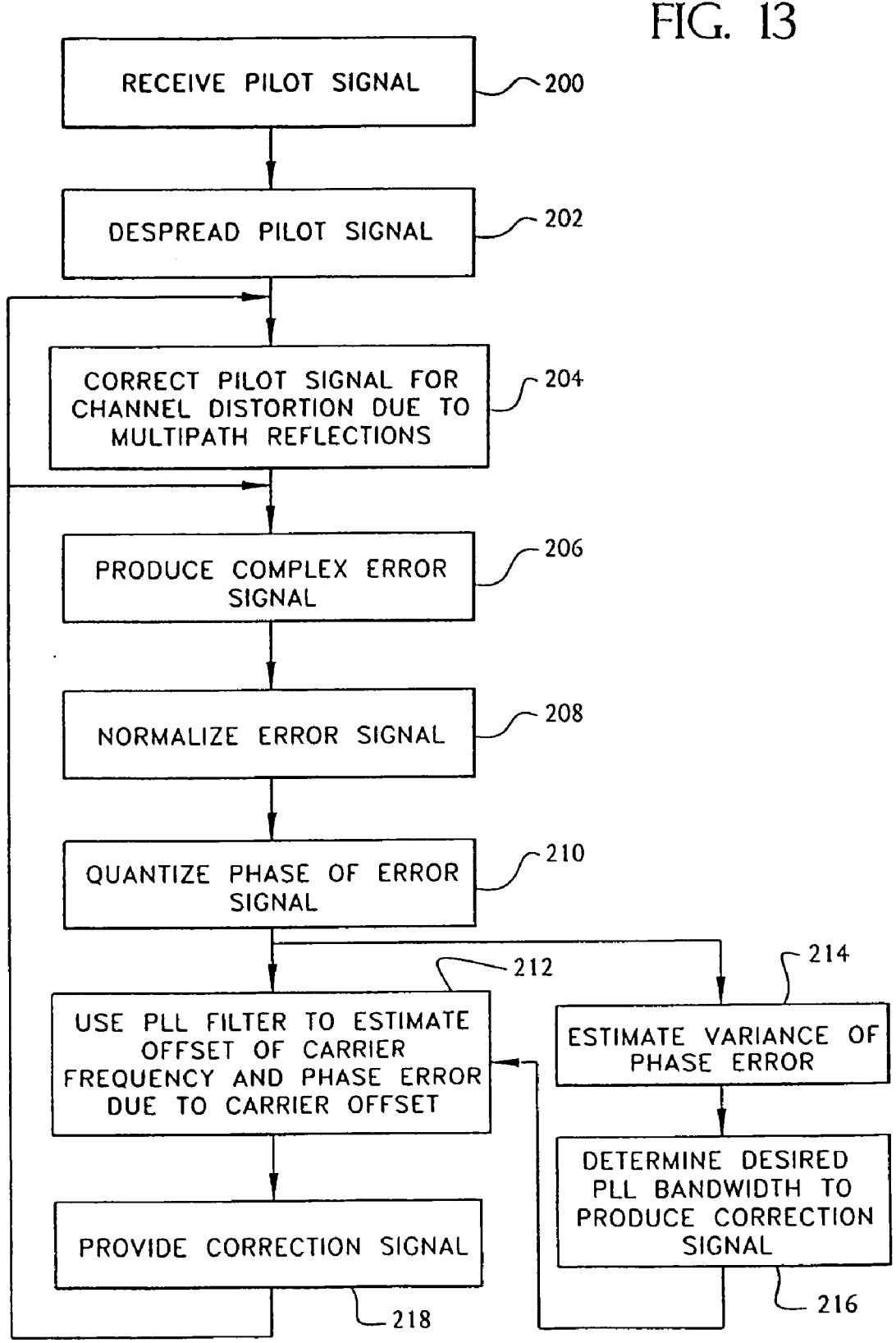
FIG. 13 is a flow diagram of the method of adjusting the PLL bandwidth in accordance with the present invention.

The process for determining the amount of phase error, determining an appropriate PLL 10 bandwidth, adjusting the PLL 10 bandwidth and controlling the VCO 118 to provide an updated correction signal 50 is summarized in FIG. 13. After the pilot signal 17 has been received (step 200) by the pilot rake receiver 40, the pilot signal 17 is despread (step 202) and corrected for channel distortion due to multipath reflections (step 204). A complex error signal is produced (step 206) and the error signal is normalized (step 208) prior to quantizing the phase of the error signal (step 210). The bandwidth control section 120 estimates the variance of the phase error (step 214) and determines the desired PLL bandwidth to produce a correction signal (step 216). The PLL filter 116 provides an estimate of the offset of the RF carrier signal and the phase error due to the carrier signal offset (step 212) and provides a correction signal (step 218) to the pilot rake receiver 40 and the data receiver 42. In this manner, the bandwidth of the PLL filter 116 is continuously adjusted and refined as the magnitude of the error signal 126 output from the arctangent analyzer 114 decreases.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention as disclosed in the teachings herein. For example, the specific transfer function may be modified depending upon the RF channel to be analyzed and the current conditions of the system. Additionally, analysis of the quantized phase error signal may be performed using a different mathematical analysis while still providing a continuously updated PLL bandwidth signal. The analysis to be performed on the quantized phase error signal is typically a trade off between the amount of processing power required for the computational analysis versus the improvement in performance.

What is claimed is:

1. A user equipment configured to receive a CDMA communication signal transmitted on an RF carrier frequency and to demodulate said RF carrier frequency to provide a received information signal, the user equipment including components configured to correct phase errors in an information signal which has been modulated on said RF carrier frequency, the user equipment comprising:
    circuitry including an adjustable bandwidth filter component configured to generate a mixing signal and to combine said mixing signal with said information signal to produce a correction signal;
    an analyzer configured to analyze the phase of said correction signal and to generate an error signal based on the deviation of the analyzed phase from a reference phase; and
    a bandwidth controller configured to recursively adjust the phase of said correction signal such that the phase of said correction signal is substantially equal to said reference phase; said bandwidth controller configured to control the bandwidth of the adjustable bandwidth filter component by selecting a bandwidth based on the error signal generated by said analyzer.

2. The user equipment of claim 1 wherein said correction signal comprises an in-phase (I) component and a quadrature (Q) component, and said analyzer further comprises a look-up table for determining the phase of said correction signal; said look-up table accepting said correction signal and generating said error signal.

3. The user equipment of claim 2 wherein said analyzer further comprises a normalizer for determining the magnitude of the I component and the magnitude of the Q component, selecting the larger of said magnitudes, and dividing both of said magnitudes by said larger magnitude to output a pseudonormalized correction signal.

4. The user equipment of claim 3 wherein said bandwidth controller further includes a bandwidth calculation mechanism which outputs a bandwidth signal based upon a transfer function.

5. The user equipment of claim 1 further comprising a rake receiver with a plurality of independent rake elements collectively acting as a filter which compensates for channel distortion due to multipath effects.

6. The user equipment of claim 5 wherein said correction signal comprises an I (in-phase) component and a Q (quadrature) component, and said analyzer further comprises a look-up table for determining the phase of said correction signal; said look-up table accepting said correction signal and generating said error signal.

7. The user equipment of claim 4 wherein said bandwidth controller further includes a bandwidth calculation mechanism which accepts said pseudonormalized correction signal and outputs a bandwidth signal based upon a transfer function.

8. The user equipment of claim 7 wherein said bandwidth controller further includes a voltage controlled oscillator configured to implement bandwidth adjustments.

9. The user equipment of claim 8 wherein said transfer function comprises a continuous function.

10. The user equipment of claim 2 wherein said look-up table comprises a matrix of at least eight discrete in-phase component values by at least eight discrete quadrature component values.

11. The user equipment of claim 2 wherein said analyzer further comprises a normalization mechanism which determines the magnitude of the correction signal and divides said correction signal by said magnitude to output a normalized correction signal.

* * * * *